(12) United States Patent
Barabash et al.

(10) Patent No.: US 11,323,287 B2
(45) Date of Patent: May 3, 2022

(54) LINK LAYER METHOD OF CONFIGURING A BARE-METAL SERVER IN A VIRTUAL NETWORK

(71) Applicant: International Business Machines Corporation, Armonk, NY (US)

(72) Inventors: Katherine Barabash, Haifa (IL); Renato Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 16/515,051

(22) Filed: Jul. 18, 2019

(65) Prior Publication Data

US 2021/0021444 A1 Jan. 21, 2021

(51) Int. Cl.
*H04L 12/46* (2006.01)
*G06F 9/455* (2018.01)

(52) U.S. Cl.
CPC ...... *H04L 12/4633* (2013.01); *G06F 9/45541* (2013.01); *G06F 9/45558* (2013.01); *H04L 12/4641* (2013.01); *G06F 2009/45595* (2013.01)

(58) Field of Classification Search
CPC ............ H04L 12/4633; H04L 12/4641; G06F 2009/45595; G06F 9/45541; G06F 9/45558; Y02D 30/00
See application file for complete search history.

(56) References Cited

U.S. PATENT DOCUMENTS

| 8,046,450 | B1* | 10/2011 | Schloss | H04L 41/0809 |
| | | | | 709/223 |
| 8,443,065 | B1* | 5/2013 | White | H04L 43/0811 |
| | | | | 709/222 |
| 8,718,071 | B2* | 5/2014 | Li | H04L 41/0853 |
| | | | | 370/397 |
| 8,959,611 | B1 | 2/2015 | Vincent et al. | |
| 9,749,231 | B2 | 8/2017 | Duda et al. | |
| 10,103,902 | B1 | 10/2018 | Sampath et al. | |
| 10,536,518 | B1* | 1/2020 | Streete | H04L 67/10 |
| 10,708,082 | B1* | 7/2020 | Bakiaraj | H04L 41/5051 |

(Continued)

OTHER PUBLICATIONS

The International Search Report and the Written Opinion of the International Searching Authority, dated Nov. 3, 2020, in corresponding PCT Application No. PPCT/132020/056658.

*Primary Examiner* — Dung B Huynh
(74) *Attorney, Agent, or Firm* — G. E. Ehrlich

(57) ABSTRACT

Methods, systems and software products for configuring a virtual port for a physical server to support packets transfer between the physical server and other network nodes over a virtual network, comprising transmitting one or more configuration Protocol Data Units (PDU) of an extended Link Layer Data Protocol (LLDP) to a Network Interface Card (NIC) of a physical server connected to a network, the configuration PDU(s) comprising one or more extension Type Length Values (TLV) defining one or more virtual network settings for a virtual network port mapping the physical server in a virtual network. The NIC is configured to deploy the virtual network port to support exchange of packets between the physical server and one or more of a plurality of nodes of the virtual network by processing outgoing and incoming packets according to one or more virtual network virtualization protocols using one or more of the virtual network settings.

20 Claims, 5 Drawing Sheets

(56) References Cited

U.S. PATENT DOCUMENTS

| | | | |
|---|---|---|---|
| 11,159,366 B1* | 10/2021 | Gawade | H04L 41/0803 |
| 11,165,716 B2* | 11/2021 | Song | H04L 49/70 |
| 2005/0135269 A1* | 6/2005 | Saint-Hilaire | H04L 41/0843 370/254 |
| 2008/0056122 A1* | 3/2008 | Madhi | H04L 45/245 370/216 |
| 2008/0310421 A1* | 12/2008 | Teisberg | H04L 41/12 370/395.53 |
| 2009/0147700 A1* | 6/2009 | Sewall | H04L 45/00 370/254 |
| 2011/0206052 A1* | 8/2011 | Tan | H04L 61/2514 370/395.53 |
| 2012/0076092 A1* | 3/2012 | Lu | H04W 28/18 370/329 |
| 2012/0131157 A1* | 5/2012 | Gospodarek | H04L 61/6022 709/222 |
| 2012/0170462 A1* | 7/2012 | Sinha | H04L 47/12 370/236 |
| 2013/0055347 A1* | 2/2013 | Chawla | G06F 21/85 726/3 |
| 2013/0198396 A1* | 8/2013 | Scherer | H04L 41/0806 709/227 |
| 2013/0242983 A1* | 9/2013 | Tripathi | H04L 47/10 370/355 |
| 2013/0250810 A1* | 9/2013 | Ho | H04L 41/12 370/255 |
| 2014/0047081 A1* | 2/2014 | Edwards | H04L 63/0272 709/220 |
| 2014/0068750 A1* | 3/2014 | Tjahjono | H04L 63/029 726/15 |
| 2014/0237585 A1* | 8/2014 | Khan | H04L 63/0272 726/15 |
| 2014/0269432 A1* | 9/2014 | Goyal | H04L 49/354 370/255 |
| 2014/0334495 A1* | 11/2014 | Stubberfield | G06F 9/5072 370/401 |
| 2015/0012771 A1* | 1/2015 | Karnowski | G06F 1/3287 713/324 |
| 2015/0023215 A1* | 1/2015 | Zhan | H04L 45/02 370/254 |
| 2015/0063170 A1* | 3/2015 | Huang | H04L 61/103 370/254 |
| 2015/0163137 A1* | 6/2015 | Kamble | H04L 49/357 370/392 |
| 2015/0200808 A1* | 7/2015 | Gourlay | H04L 47/20 709/225 |
| 2015/0271022 A1* | 9/2015 | Seligson | H04L 12/6418 370/254 |
| 2016/0014142 A1* | 1/2016 | Wang | H04L 63/162 726/4 |
| 2016/0065479 A1* | 3/2016 | Harper | H04L 47/125 370/235.1 |
| 2016/0087885 A1* | 3/2016 | Tripathi | H04W 76/12 370/389 |
| 2016/0119251 A1* | 4/2016 | Solis | H04L 67/327 709/224 |
| 2016/0182384 A1 | 6/2016 | Kamble et al. | |
| 2016/0246635 A1* | 8/2016 | Kaplan | G06F 9/50 |
| 2016/0301608 A1* | 10/2016 | Natarajan | H04L 45/7453 |
| 2017/0019304 A1* | 1/2017 | Zhang | H04L 41/12 |
| 2017/0026335 A1* | 1/2017 | Dhulipala | H04L 41/0806 |
| 2017/0180213 A1* | 6/2017 | Li | H04L 41/08 |
| 2017/0237601 A1* | 8/2017 | Zhu | H04L 41/0233 709/223 |
| 2017/0374101 A1 | 12/2017 | Woolward et al. | |
| 2018/0124139 A1 | 5/2018 | Jiang et al. | |
| 2019/0075019 A1* | 3/2019 | Wang | H04L 41/0806 |
| 2019/0132143 A1* | 5/2019 | Wei | H04L 12/1886 |
| 2019/0132291 A1* | 5/2019 | Zhao | G06F 9/45558 |
| 2019/0190887 A1* | 6/2019 | Yan | H04L 61/2007 |
| 2019/0213152 A1* | 7/2019 | Jacobs | G06F 1/08 |
| 2019/0230039 A1* | 7/2019 | Wang | H04L 49/70 |
| 2019/0273718 A1* | 9/2019 | Ahuja | H04L 63/0236 |
| 2019/0394066 A1* | 12/2019 | Lin | H04L 45/28 |
| 2020/0007400 A1* | 1/2020 | Ballard | G06F 9/45558 |
| 2020/0019425 A1* | 1/2020 | Toy | G06F 9/45558 |
| 2020/0021522 A1* | 1/2020 | Singarayan | H04L 49/25 |
| 2020/0059370 A1* | 2/2020 | Abraham | H04L 67/10 |
| 2020/0097310 A1* | 3/2020 | Shukla | H04L 12/66 |
| 2020/0150163 A1* | 5/2020 | Beishline | G01R 19/257 |
| 2020/0169498 A1* | 5/2020 | Civil | H04L 61/6009 |
| 2020/0213246 A1* | 7/2020 | Pan | G06F 15/17331 |
| 2020/0322380 A1* | 10/2020 | Sheth | H04L 63/0853 |
| 2020/0344089 A1* | 10/2020 | Motwani | H04L 12/4641 |
| 2020/0344179 A1* | 10/2020 | Iyer | H04L 49/3054 |
| 2020/0382343 A1* | 12/2020 | Sinha | H04L 49/1515 |
| 2020/0412558 A1* | 12/2020 | Ballard | H04L 12/12 |

* cited by examiner

LINK LAYER METHOD OF CONFIGURING A BARE-METAL SERVER IN A VIRTUAL NETWORK

BACKGROUND

The present invention, in some embodiments thereof, relates to configuring a virtual network port mapping a physical server in a virtual network, and, more specifically, but not exclusively, to extending a network Link Layer Discovery Protocol (LLDP) to support configuration of a virtual network port mapping a physical server in a virtual network.

The constant increase in scale of networks, for example, in data centers, in cloud services and/or the like leads to increased reliance on virtual networking providing an abstraction layer over one or more networks to facilitate full software control over the network thus enabling simple and highly scalable network routing structures. In fact, the capability to virtualize networks, workloads, and applications and then move them across network infrastructure gave rise to the first cloud architectures.

Applying virtual networking, logical networks which are completely decoupled from physical servers may be rapidly and easily constructed to orchestrate workloads across this logical space. This way, virtual networks may extend beyond the boundaries of a physical network. Virtual networking is further beneficial in terms of flexibility, isolation and automation facilitated by the software-based management of the network.

The virtual networking fundamentally facilitates data communication between a plurality of components virtualized in the computing environment, for example, a Virtual Private Cloud (VPC) operated by a VPC provider to serve one or more clients. Such virtualized components (nodes) may include virtual machines (VM), containers, unikernels and/or the like.

However, while the virtual network is primarily directed to provide network abstraction for the virtualized nodes, in some deployments one or more physical servers may also be included in the VPC by connecting to the virtual network. Such physical servers, specifically, client owned bare-metal servers which are deployed as part of the VPC are configured to execute under full control of the client in order to ensure privacy, segregation (isolation) and security of the client owned physical server.

SUMMARY

According to a first aspect of the present invention there is provided a method of configuring a virtual port for a physical server to support packets transfer between the physical server and other network nodes over a virtual network, comprising using one or more processors for transmitting one or more configuration Protocol Data Units (PDU) of an extended Link Layer Data Protocol (LLDP) to a Network Interface Card (NIC) of a physical server connected to a network, one or more of the configuration PDUs comprising one or more extension Type Length Values (TLV) defining one or more virtual network settings for a virtual network port mapping the physical server in a virtual network. The NIC is configured to deploy the virtual network port to support exchange of packets between the physical server and one or more of a plurality of nodes of the virtual network by processing outgoing and incoming packets according to one or more virtual network virtualization protocols using one or more of the virtual network settings.

According to a second aspect of the present invention there is provided a system for configuring a virtual port for a physical server to support packets transfer between the physical server and other network nodes over a virtual network, comprising one or more processors executing a code. The code comprising code instructions to transmit one or more configuration Protocol Data Units (PDU) of an extended Link Layer Data Protocol (LLDP) to a Network Interface Card (NIC) of a physical server connected to a network. One or more of the configuration PDU comprising one or more extension TLVs defining one or more virtual network settings for a virtual network port mapping the physical server in a virtual network. The NIC is configured to deploy the virtual port to support exchange of packets between the physical server and one or more of a plurality of nodes of the virtual network by processing outgoing and incoming packets according to one or more virtual network virtualization protocol using one or more of the virtual network settings.

According to a third aspect of the present invention there is provided a computer program product for configuring a virtual port for a physical server to support packets transfer between the physical server and other network nodes over a virtual network, comprising a non-transitory computer readable storage medium and first program instructions for transmitting one or more configuration PDUs of an extended LLDP to a NIC of a physical server connected to a network. One or more of the configuration PDUs comprising one or more extension TLVs defining one or more virtual network settings for a virtual network port mapping the physical server in a virtual network. The NIC is configured to deploy the virtual port to support exchange of packets between the physical server and one or more of a plurality of nodes of the virtual network by processing outgoing and incoming packets according to one or more virtual network virtualization protocol using one or more of the virtual network settings. Wherein the first program instructions are executed by one or more processors from the non-transitory computer readable storage medium.

In a further implementation form of the first, second and/or third aspects, the virtual network is at least part of a Virtual Private Cloud (VPC).

In a further implementation form of the first, second and/or third aspects, the physical server is a bare-metal server deployed as part of a VPC.

In a further implementation form of the first, second and/or third aspects, the virtual network virtualization protocol comprising one or more virtual network encapsulation protocols. The virtual network port supports exchange of the packets by encapsulating and de-capsulating outgoing and incoming packets according to one or more of the virtual network encapsulation protocol using one or more of the virtual network settings.

In a further implementation form of the first, second and/or third aspects, the virtual network encapsulation protocols comprise one or more members of a group consisting of: Virtual Extensible Local Area Network (VXLAN), Network Virtualization using Generic Routing Encapsulation (NVGRE), Generic Network Virtualization Encapsulation (GENEVE) and/or Stateless Transport Tunneling (STT).

In a further implementation form of the first, second and/or third aspects, one or more of the configuration PDU are defined by an extended Data Center Bridging Exchange (DCBX) extension of the LLDP. The extended DCBX is extended to support one or more of the extension TLVs.

In a further implementation form of the first, second and/or third aspects, the virtual network settings comprise one or more members of a group consisting of: a virtual network address assigned to the virtual network port deployed to map a network port of the physical server in a range of virtual addresses of the virtual network, a virtual network identifier (VNID) of the virtual network, a VPC identifier (VPC ID), a security group association for the physical server and a multicast group association for the physical server.

In a further implementation form of the first, second and/or third aspects, the virtual network address defines an Internet Protocol (IP) address assigned to the virtual network port deployed in the NIC in the range of IP addresses of the virtual network.

In an optional implementation form of the first, second and/or third aspects, the virtual network address defines a Media Access Control (MAC) address assigned to the virtual network port, the virtual network port applies the IP address and the MAC address for encapsulation and de-capsulation.

In a further implementation form of the first, second and/or third aspects, each of the packets exchanged between the NIC of the physical server and one or more of the nodes of the virtual network is a member of a group consisting of: a unicast packet, a multicast packet and a broadcast packet.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
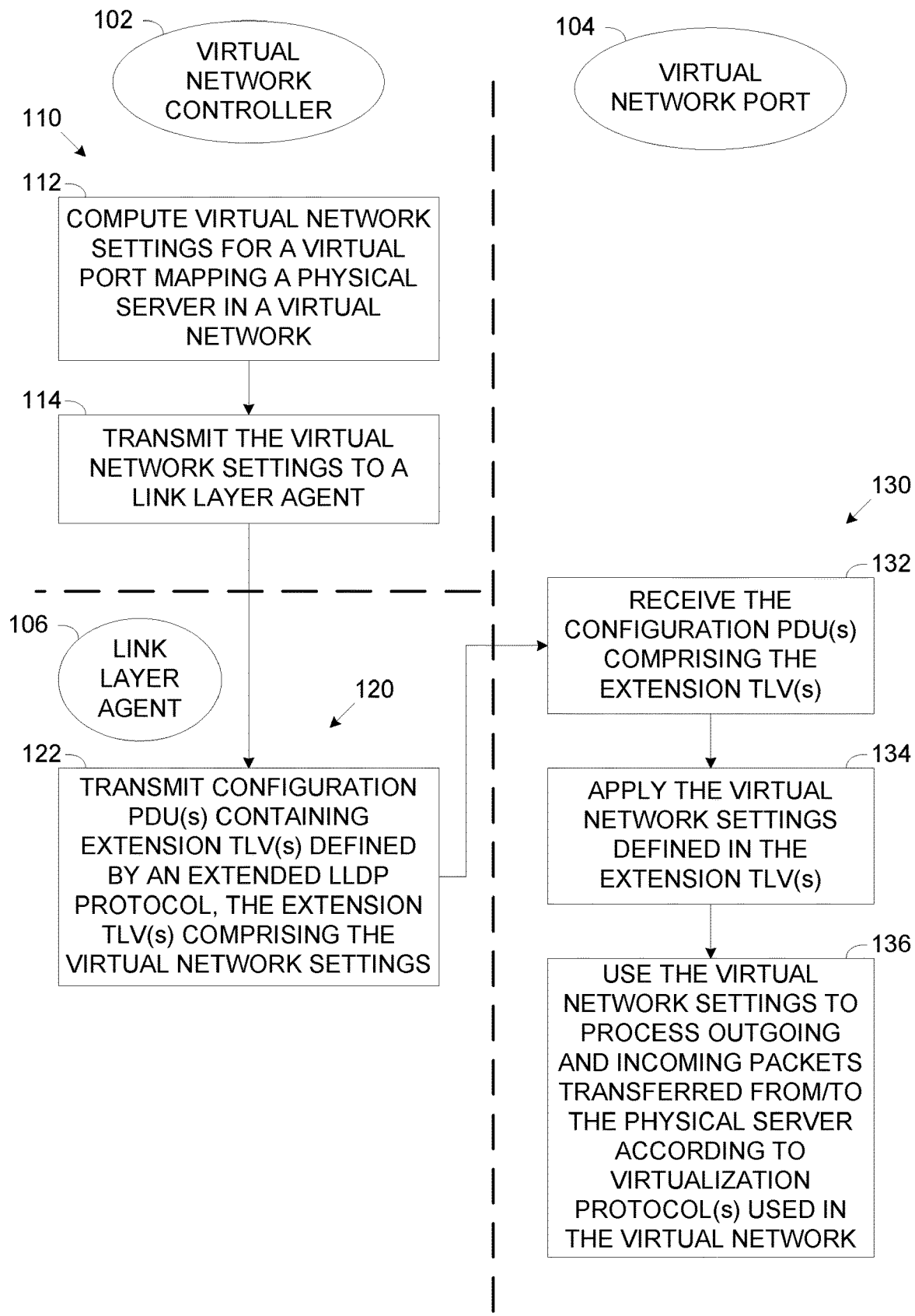
FIG. 1 presents flow charts of exemplary processes of transferring virtual network settings to a virtual network port mapping a physical server in a virtual network to support packets transfer between the physical server and nodes connected to the virtual network, according to some embodiments of the present invention.

The present invention, in some embodiments thereof, relates to configuring a virtual network port mapping a physical server in a virtual network, and, more specifically, but not exclusively, to extending a network LLDP protocol to support configuration of a virtual network port mapping a physical server in a virtual network.

According to some embodiments of the present invention, there are provided methods, systems and computer program products for configuring a virtual network port deployed to map a physical server in a virtual network in order to support exchange of data packets over the virtual network between the physical server and one or more of a plurality of network nodes of the virtual network. Configuration of the virtual network port is done using one or more link layer configuration protocols extended to support delivery of virtual network settings assigned to the virtual network port. Such link layer configuration protocols may include, for example, Link Layer Discovery Protocol (LLDP), Data Center Bridging Capabilities Exchange Protocol (DCBX) which is an extension to the LLDP protocol and/or the like.

The virtual network, for example, a Software Defined Network (SDN) may provide a logical network abstraction over a physical network to connect the plurality of network nodes which may include, for example a virtual machine, a virtual router, a virtual router interface, a physical host mapped through a virtual endpoint, a physical router mapped through a virtual endpoint, a container, a unikernel, a virtual interface mapping one or more virtual and/or hardware resources and/or the like. The virtual network may constitute at least part of a Virtual Private Cloud (VPC) operated by a VPC provider to serve one or more clients.

The network nodes of the virtual network apply one or more of a plurality of virtual network virtualization and/or tunneling protocols for constructing and using virtual domain over the virtual network. For example, the network nodes may employ one or more virtual network encapsulation protocols to exchange data packets among them, for example, Virtual Extensible LAN (VXLAN), Network Virtualization using Generic Routing Encapsulation (NVGRE), Generic Network Virtualization Encapsulation (GENEVE), Stateless Transport Tunneling (STT) and/or the like.

The physical server, specifically, a client owned bare-metal server which may be deployed as part of the VPC typically must not execute VPC provider software components in order to ensure privacy, segregation (isolation) and security of the client owned physical server. Since VPC provider software components must not be executed by the physical server, in particular for implementing the virtual network connectivity, the physical server is thus incapable of directly communicating with the network nodes over the VPC defined virtual network using the virtual network virtualization protocol(s).

The virtual network port may be therefore deployed to map the physical server in the virtual network and support transmission of data packets (e.g. unicast packets, multicast packets and/or broadcast packets) from the physical server to the virtual network node(s) and/or reception of packets from the virtual network node(s) at the physical server. To this end, the virtual network port may encapsulate outgoing packets (egress traffic) transmitted from the physical server according to the virtual network encapsulation protocols used by the virtual network nodes. On the ingress path, the virtual network port may de-capsulate incoming packets received from one or more of the virtual network nodes which are destined for the physical server.

However, since privacy, segregation and security of the client owned physical server may not be compromised by executing VPC provider software components, the virtual network port may not be deployed on the physical server itself, specifically not within the execution environment of the physical server serving the client.

In order to enable connectivity of the physical server to the virtual network while maintaining the privacy of the client's execution environment, the virtual network port may be deployed in one or more network circuitries connecting the physical server to the network on which the virtual network is deployed. Specifically, the virtual network port may be deployed in a network interface, for example, a Network Interface Controller (NIC) of the physical server which connects the physical server to the switch. In particular, the network interface of the physical server may be an enhanced network interface comprising sufficient processing and memory resources for realizing the virtual network port.

In order to process the packets exchanged between the physical server and the virtual network node(s) according to the virtual network virtualization and/or tunneling protocols used by the virtual network nodes, the virtual network port must apply one or more virtual network settings specific to the virtual network and uniquely identifying the virtual network port. These virtual network settings may include, for example, a Virtual Network identifier (VNID), a VPC identifier (VPC ID), an Internet Protocol (IP) address assigned to the virtual network port in a range of IP addresses defined for the virtual network, a Media Access Controller (MAC) assigned to the virtual network port which is unique in the virtual network, a security group (SG) association of the physical server in the virtual network and/or the like.

The virtual network port deployed to connect the physical server to the virtual network is not inherently controlled by one or more virtual network controllers, for example, an SDN controller and/or the like deployed and executed to configure, control, manage and/or monitor the virtual network. This is since as described herein above, the VPC provider may not deploy software components on the physical server since such software components may intentionally and/or unintentionally violate the privacy, security and isolation of the client. The virtual network controller therefore needs to transmit the virtual network settings to the virtual network port.

Moreover, in some deployments of the physical server in the VPC, the virtual network controller(s) may not be able to control the network interface of the physical server using high level network management protocols such as, for example, Simple Network Management Protocol (SNMP), Network Configuration Protocol (NETCONF) and/or the like. In order to support high scalability (to support multiple virtual network ports), reduce complexity and/or support legacy networking equipment, the virtual network controller(s) may transmit the virtual network settings to enhanced network interface implementing the virtual network port using one or more link layer configuration protocols, for example, LLDP, DCBX and/or the like. Such link layer configuration protocols are commonly used in most if not all network infrastructures and are hence supported by most of the existing networking equipment including the enhanced network interface of the physical server.

In particular, the link layer configuration protocol(s) may be extended to support delivery of the virtual network settings to the virtual network port. For example, one or more extension Type Length Value (TLV) elements may be added to the link layer configuration protocol(s) to enable delivery of the virtual network settings from the virtual network controller(s) to the physical server, specifically to the enhanced network interface of the physical server.

The virtual network controller(s) may transmit one or more of the extension TLV(s) encoding and/or defining the virtual network settings assigned to the virtual network port for mapping the physical server in the virtual network. The enhanced network interface which is configured to support the extension TLV(s) may extract the virtual network settings from the extension TLV(s) and may apply them to deploy the virtual network port.

After properly deployed, the virtual network port may process outgoing packets and incoming packets according to the virtual network virtualization and/or tunneling protocol(s) employed in the virtual network using the virtual network settings assigned to the virtual network port. For example, the virtual network port may encapsulate and de-capsulate the outgoing packets and the incoming packets respectively according to the virtual network encapsulation protocols using the virtual network settings assigned to the virtual network port.

Configuring and deploying the virtual network port in the enhanced network interface of the physical server to map the physical server in the virtual network may present significant advantages compared to currently existing methods and systems for connecting physical servers to virtual networks.

Connecting the physical server, in particular the client owned bare-metal server to the virtual network may be highly desirable and in many cases essential for a plurality of applications, for example, connecting the bare-metal server which is under full control of the client to a VPC operated by the VPC provider to serve the client.

Some of the existing methods for connecting physical servers to virtual networks may include deploying on the physical server a virtualization layer for instrumenting a virtual network component (e.g. a virtual switch) which is owned and controlled by the provider of the virtual network, i.e. the VPC provider and exposing a single virtual server to the client, in place of a client owned physical server. This solution may be simple and highly aligned with the virtual network architecture applied in the VPC which thus views the physical server as any other virtual node. However, this approach may significantly compromise the client owned physical server service provided to the client who is thus not in full control of the execution environment of the physical server. In contrast, deploying the virtual network port in the enhanced network interface of the physical server which maintains a completely separate execution environment does not impact, affect and/or compromise the execution environment of the physical server which is thus entirely under control of the client (the single tenant).

Other exiting methods may include deploying the virtual network port in the enhanced network interface (Smart NIC) of the physical server where the Smart NIC having its own full execution environment (processor(s), memory resources, connection to a control network) that is fully controlled by the provider of the virtual network, i.e. the VPC provider, over the control interface invisible to the client. This solution may also be highly aligned with the virtual network architecture applied in the VPC. This approach however may present significant limitations. First, configuring and/or managing the switch needs to be in the physical network domain rather than in the virtual network domain and thus may break the virtual network architecture. Moreover, the deployment implementation of virtual network ports in switches may be specific to each switch vendor thus presenting a major scalability and vendor lock-in limitations. In addition, in order to support (remote) control over the Smart NIC, the Smart NIC may be significantly complex and hence costly in terms of development and/or production. On the other hand, the virtual network port deployed on the enhanced network interface of the physical server according to the present invention is configured using standard and commonly used network link layer configuration protocols (e.g. LLDP, DCBX) extended to support the delivery of the virtual network settings to the enhanced network interface of the physical server. These link layer configuration protocols are inherently extensible and therefore present an insignificant effort to extend with the extension configuration and optionally the extension response objects. As standard networking equipment, for example, the enhanced network interface of the physical server inherently supports these link layer configuration protocols, no special capabilities, features and/or functionality needs to be implemented in the enhanced network interface thus making it significantly simple and low cost.

Employing the link layer configuration protocols for delivering the virtual network settings to the enhanced network interface may be of even greater benefit in a plurality of common and wide spread virtual network and/or VPC deployments in which the physical server cannot be remotely managed using one or more higher level network management protocols such as, for example, SNMP, NETCONF and/or the like. While accessing the physical server using the network management protocols may be impossible, the physical server, in particular the enhanced network interface of the physical server is naturally accessible using the low level link layer configuration protocols, for example the LLDP and the DCBX. These low level link layer configuration protocols constitute a fundamental and essential part of the network configuration, control and/or management without which the network may not be properly deployed. The enhanced network interface must therefore support and respond to configuration PDUs of one or more of these link layer configuration protocols.

Other exiting methods may include deploying the virtual network port in the switch connecting the physical server to the network. This solution may be significantly simple to apply as currently existing switches are typically capable of supporting virtual network ports. This solution is also fully transparent to the client (single tenant), i.e. to the physical server hosting the single tenant and thus ensures full privacy, segregation and security of the client. This approach however may present significant limitations. First, the switch needs to be configured and/or managed in the physical network domain rather than in the virtual network domain thus breaking the virtual network architecture. Moreover, the deployment implementation of virtual network ports in switches may be specific to each switch vendor thus presenting a major scalability and vendor lock-in limitations. This is in contrast to the virtual network port deployment on the enhanced network interface at the physical server side. Scalability is therefore significantly increased and vendor lock-in is avoided since the virtual network port is deployed at the physical server side thus independent and indifferent to the switch thus enabling use of practically any switch from any vendor may be used to deploy the virtual network port.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the figures, FIG. 1 presents flow charts of exemplary processes of transferring virtual network settings to a virtual network port mapping a physical server in a virtual network to support packets transfer between the physical server and nodes connected to the virtual network, according to some embodiments of the present invention.

Exemplary processes 110, 120 and 130 may be executed to transfer one or more virtual network settings to a virtual network port 104 deployed to map a physical server in a virtual network, for example, an SDN providing a logical network abstraction over a physical network. The virtual network port 104 is deployed to support packets transfer between the physical server and one or more network nodes connected to the virtual network, e.g. by encapsulating and de-capsulating outgoing and incoming packets according to one or more virtual network encapsulation protocols applied by the network nodes of the virtual network, for example, VXLAN, NVGRE, GENEVE, STT and/or the like.

The virtual network may constitute at least part of a VPC (which may stretch across a plurality of virtual networks) comprising a plurality of network nodes which apply one or more of the virtual network virtualization and/or tunneling protocols to exchange data packets among them. The physical server, for example, a single-tenant bare-metal server may be deployed as part of the VPC. However, the physical server, specifically the bare-metal server may have no virtualization layer and is thus incapable of directly connecting to the virtual network to communicate with the virtual network nodes employing the virtual network virtualization protocol(s).

The process 110 may be executed, for example, by a virtual network controller 102 to transfer to the physical server the virtual network settings, for example, VNID, VPC ID, IP address, MAC address, security group (SG) association of the physical server and/or the like assigned for the virtual network port 104. The virtual network controller 102 typically does not directly transmit the virtual network settings to the physical server but rather communicates with one or more link layer agents deployed in the network. The virtual network controller 102 may transfer the virtual network settings to the link layer agent(s) using one or more higher level protocols, for example, a network management protocol (e.g. SNMP, NETCONF, etc.).

The process 120 may be executed by one or more of the link layer agents deployed in one or more of the physical network nodes, for example, in a switch, specifically an edge switch connecting the physical server to the network. The link layer agent may be configured to support one or more network link layer configuration protocols, for example, LLDP and/or the like extended to support delivery of the virtual network settings. In particular the LLDP protocol is extended to include one or more extension TLVs added to extend the LLDP protocol for delivery of the virtual network settings. The link layer agent may therefore create one or more LLDP configuration PDUs comprising the virtual network settings received from the virtual network controller 102 and transmit the LLDP configuration PDU(s) to the physical server.

The process 130 may be executed by the virtual network port 104 executed, implemented and/or realized on the enhanced network interface of the physical server. The virtual network port 104 is configured to support reception, decoding and/or processing of the extension TLV(s) appended to the LLDP protocol for defining the virtual network settings. The virtual network port 104 may therefore receive one or more extension TLVs from the network controller 102 and may further apply virtual network settings extracted from the received extension TLV(s).

After receiving the virtual network settings, the virtual network port 104 may exchange packets between the physical server and one or more of the network nodes of the virtual network according to one or more virtual network virtualization and/or tunneling protocols, for example, encapsulation protocols using the received virtual network settings. In particular, the virtual network port 104 may encapsulate packets transmitted from the physical server to the virtual network node(s) and de-capsulate packets received from virtual network node(s) which are directed to the physical server.

Figure 2:
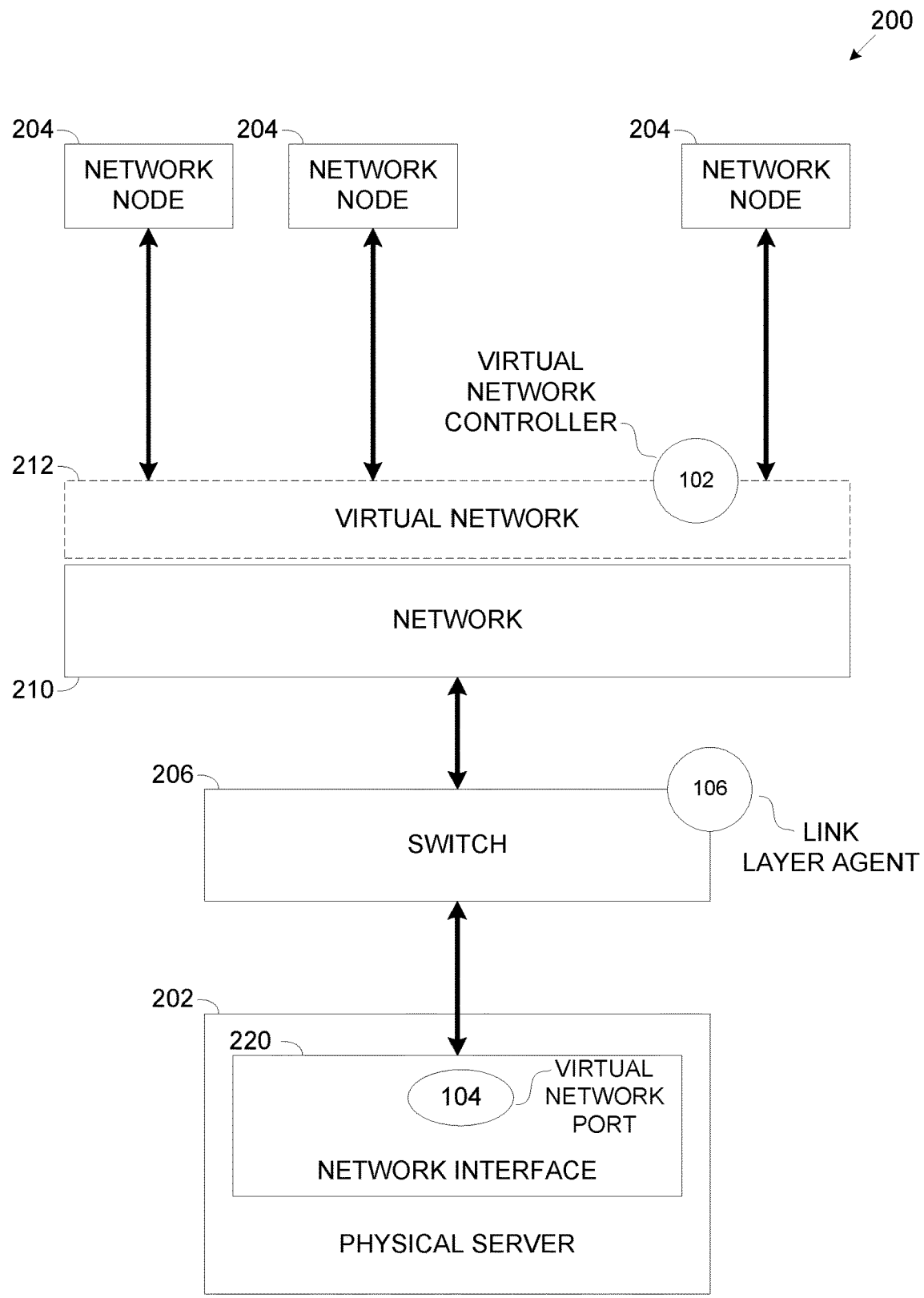
FIG. 2 is a schematic illustration of an exemplary system for transferring virtual network settings to a virtual network port mapping a physical server in a virtual network to support packets transfer between the physical server and nodes connected to the virtual network, according to some embodiments of the present invention.

Reference is also made to FIG. 2, which is a schematic illustration of an exemplary system for transferring virtual network settings to a virtual network port mapping a physical server in a virtual network to support packets transfer between the physical server and nodes connected to the virtual network, according to some embodiments of the present invention.

An exemplary networked system 200 may include a physical server 202 connected via a switch 206 to a network 210, for example, a Local Area Network (LAN), a Wide Area Network (WAN), a Metropolitan Area Network (MAN) and/or the like. The physical server 202 may connect to the switch 206 using a network interface 220, for example, a NIC and/or the like supporting connectivity to one or more networks. In the network interface 220 may be an enhanced network interface 220, for example, a Smart NIC comprising one or more processors and memory resources for program and/or data store.

A virtual network 212 provides a logical network abstraction over the physical network 210. In particular, the network 210 may be part of an infrastructure of a data center hosting a one or more VPCs. A virtual network 212, for example, an SDN providing a logical network abstraction over the physical network 210 may constitute at least part of a VPC comprising a plurality of network nodes 204. The network nodes 204, for example, a virtual machine, a virtual router, a virtual router interface, a physical host mapped through a virtual endpoint, a physical router mapped through a virtual endpoint, a container, a unikernel, a virtual interface mapping one or more virtual and/or hardware resources and/or the like hosted (executed) by one or more of a plurality of physical nodes connected to the network 210, for example, a server, a switch, a router, network equipment and/or the like.

One or more of the hosting physical network nodes comprising one or more processors, memory resources for program and/or data store may execute one or more software modules, for example, a process, a script, an application, an agent, a utility, a tool, an Operating System (OS), a service, a plug-in, an add-on and/or the like. Each of the software modules comprises a plurality of program instructions which may be executed by the processor(s) of the physical network node(s) from the respective program store. In particular, one or more of the physical network nodes may execute a virtual network controller 102 to configure, control and/or monitor the virtual network 212. For example, in case of the SDN, one or more instances of an SDN controller may be executed by one or more of the physical network nodes to configure, control and/or monitor the SDN. Optionally, one or more of the network nodes 204, specifically the virtualized network nodes 204 may execute one or more instances of the SDN controller.

The switch 206 connecting the physical server 202 to the network 210 may be regarded as an edge switch since it is located at the edge of the virtual network 212 with respect to the physical server 202. The switch 206 may include one or more hardware elements, execute, implement and/or facilitate a link layer agent 106. The switch 206 may include one or more hardware elements, for example, a circuit, a component, an Integrated Circuit (IC), an Application Specific Integrated Circuit (ASIC), a Field Programmable Gate Array (FPGA), a Digital Signals Processor (DSP), a network processor and/or the like. The switch 206 may optionally comprise one or more processors and memory resources for program and/or data store for executing one or more software modules each comprising a plurality of program instructions which may be executed by the processor(s) of the switch 206 from the program store of the switch 206. The link layer agent 106 deployed on the switch 206 may be therefore realized, implemented and/or executed by one software modules, hardware elements and/or a combination thereof of the switch 206. The link layer agent 106 may be configured to create the LLDP configuration PDU(s) comprising the virtual network settings and transmit them over the network 210.

The enhanced network interface 220 may include sufficient processing resources, memory resources and networking resources for instrumenting the virtual network port 104 by processing of data packets exchanged between the physical server 202 and the network nodes 204 of the virtual network 212 according to one or more of the virtualization and/or tunneling protocols implementing virtual network 212 and typically employed by the network nodes 204. The enhanced network interface 220 may utilize one or more hardware elements for executing the process 130, for example, a circuit, a component, an IC, an ASIC, an FPGA, a DSP, a network processor and/or the like. The enhanced network interface 220A may optionally comprise one or more processors and memory resources for program and/or data store for executing one or more software modules each comprising a plurality of program instructions which may be executed by the processor(s) of the enhanced network interface 220 from the program store of the enhanced network interface 220. The virtual network port 104 executed by enhanced network interface 220 may be therefore realized, implemented and/or executed using one software modules, hardware elements and/or a combination thereof. It should be noted that the execution environment of the enhanced network interface 220 is completely separated from the execution environment of the physical server 202 such that there is complete isolation between the two execution environments. The execution environment of the physical server 202 which may be under control of the client is therefore not violated and/or compromised.

As shown at 112, the virtual network controller 102, for example, the SDN controller computes one or more virtual network settings for the virtual network port 104 deployed to map the physical server 202 in the virtual network 212, for example, a VNID, a VPC ID, an IP address, a MAC address, one or more SG (security group) settings associated with the physical server 202 and/or the like.

The virtual network controller 102 may compute the virtual network settings to comply with the settings of the virtual network 212. For example, the VNID assigned by the virtual network controller 102 to the virtual network port 104 is the identifier (ID) of the virtual network 212. In another example, as the virtual network 212 may be part of a VPC, the VPC ID assigned by the virtual network controller 102 to the virtual network port 104 is the identifier (ID) of the VPC. In another example, the IP address assigned by the virtual network controller 102 to the virtual network port 104 is in a range of IP addresses of the virtual network 212, i.e. within the range of IP addresses assigned to the network nodes 204. In another example, the MAC address assigned by the virtual network controller 102 to the virtual network port 104 is a unique MAC in the virtual network 212, i.e. different from the MAC addresses of all the network nodes 204.

As shown at 114, the virtual network controller 102 transmits the virtual network settings via the network 210 to the enhanced network interface 220 which is configured to deploy the virtual network port 104. Specifically, the virtual network controller 102 may transmit the virtual network settings to the physical server 202 via one or more link layer agents deployed in one or more of the physical network nodes connected to the network 210, for example, the switch 206.

The virtual network controller 102 may communicate with one or more of the LLDP agents using one or more network protocols, for example, a network management protocol such as, for example, SNMP, NETCONF and/or the like. Using such network protocols, the virtual network controller 102 may transmit the virtual network settings to the LLDP agent(s).

As shown at 122, the link layer agent 106 which is configured to support one or more of the network link layer configuration protocols, for example, the LLDP protocol extended to support delivery of the virtual network settings may transmit the received virtual network settings in one or more configuration PDUs of the extended LLDP protocol. Specifically, the link layer agent 106 may transmit the virtual network settings in one or more configuration PDUs defined by the DCBX protocol which is an extension to the LLDP protocol. The DCBX may be extended to include one or more extension TLVs which are defined to include the virtual network settings and may be transmitted in one or more of the configuration PDUs.

The enhanced network interface 220 configured to deploy the virtual network port 104 is further configured to receive, decode, process and apply the extension TLV(s) encoding the virtual network settings assigned for the virtual network port 104.

Transmission of the extension configuration message(s) encoding the virtual network settings from the virtual network controller 102 to the switch 206 and further to the enhanced network interface 220 may depend on the specifics of the implementation. For example, the virtual network controller 102 may use a control and/or management plane of the network 210 to transmit the virtual network settings to the link layer agent 106 deployed on the switch 206. The link layer agent 106 configured to support processing and/or encoding of the extension TLVs may in turn encode the received virtual network settings in one or more extension TLVs. Using its flow control engine, the link layer 106 may transmit to the enhanced network interface 220 one or more configuration PDUs comprising the extension TLV(s).

As shown at 132, the enhanced network interface 220, in particular the virtual network port 104 receives the configuration PDU(s) containing the extension TLV(s) encoding the virtual network settings assigned to the virtual network port 104 for mapping the physical server 202 in the virtual network 212. The virtual network port 104 may extract the extension TLV(s) from the received configuration PDU(s) and may decode the received extension TLV(s) to extract the encoded virtual network settings.

Since the transmission of the extension TLVs from the switch 206 and reception of the extension TLVs at the enhanced network interface 220 is done using the link layer, in particular the LLDP protocol and its DCBX extension protocol, the TLV(s) may be transmitted in one or more configuration PDU of the LLDP applying link layer flow control for PDUs transmission and acknowledge signals.

The link layer agent 106 may therefore allocate and manage one or more memory structures of the switch 206, for example, a buffer for storing the extension TLV(s) comprising the virtual network settings assigned for the virtual network port 104. Using the data processing engine and flow control engine of the switch 206, the link layer agent 106 may transmit a first configuration PDU of the LLDP or DCBX protocols comprising at least part of a first extension TLV retrieved from the buffer. The link layer agent 106 may then wait for an acknowledge signal transmitted by the enhanced network interface 220 in response to reception of the first configuration PDU. After the acknowledge signal is received and identified by the flow control engine of the switch 206, the link layer agent 106 may transmit a second configuration PDU of the LLDP or DCBX protocols comprising another part of the first extension TLV or at least part of a second extension TLV retrieved from the buffer. This process may continue until transmitting to the enhanced network interface 220 all the extension TLV(s) stored in the buffer. Each extension TLV which is successfully transmitted may be removed from the buffer. However, extension TLVs and/or part thereof included in configuration PDU(s) which failed to be properly received by the enhanced network interface 220 (i.e., respective acknowledge signal(s) not received at the switch 206) may be re-transmitted by the link layer agent 106 to the enhanced network interface 220.

The enhanced network interface 220 executing the virtual network port 104 may apply a similar mechanism for storing the extension TLV(s) received from the switch 206 in one or more memory structures, for example, a buffer allocated and managed by the enhanced network interface 220. Using the data processing engine and flow control engine of the enhanced network interface 220, the virtual network port 104 may receive the configuration PDU(s) of the LLDP or DCBX protocols comprising the extension TLV(s) and respond with a respective acknowledge signal upon reception of each configuration PDU.

A shown at 134, the virtual network port 104 may apply the virtual network settings assigned by the virtual network controller 102 for mapping the physical server 202 in the virtual network 212 to support data packets transfer between the physical server 202 and the network nodes 204. For example, the virtual network port 104 may update the virtual network settings in one or more data plane mapping records, for example, a routing table, a routing map, a memory, a database and/or the like used by the enhanced network interface 220 to resolve source and/or destination addresses for transmitted and/or received packets.

As shown at 136, after applying the virtual network settings, the virtual network port 104 may exchange packets between the physical server 202 and one or more of the network nodes 204 over the virtual network 212 by processing the packets according to one or more of the virtualization and/or tunneling protocols employed in the virtual network 212. This processing may include, for example, encapsulation and de-capsulation, packet filtering, implicit packets routing, "ARP responding and more. For example, the virtual network port 104 may encapsulate and de-capsulate outgoing and incoming packets respectively according to one or more of the virtual network encapsulation protocols using one or more of the virtual network settings. As such, the virtual network port 104 may encapsulate one or more data packets, for example, a unicast packet, a multicast packet and/or a broadcast packet transmitted from the physical server 202 transmitted to one or more of the network nodes 204 in one or more encapsulation packets compliant with the virtual network encapsulation protocol used in the virtual network 212, for example, VXLAN, NVGRE, GENEVE, STT and/or the like. Complementary, the virtual network port 104 may de-capsulate one or more encapsulation packets, for example, unicast packet, multicast packet and/or broadcast packet received from one or more of the network nodes 204 and forward the extracted packet(s) to the physical server 202.

For example, the virtual network port 104 may encapsulate a packet transmitted by the physical server 202 in one or more encapsulation packets having a header complying with the virtual network encapsulation protocol used in the virtual network 212, for example, VXLAN. The header may naturally include the VNID of the virtual network 212. The header may further include the source IP address (i.e. the IP address assigned to the virtual network port 104) and the IP address of a destination network node 204 to which the packet is transmitted. In case the virtual network 212 is at least part of a VPC, the virtual network port 104 may include the VPC ID of the VPC in the header of the encapsulation packet(s). Optionally, the virtual network port 104 includes the source MAC address (i.e. the MAC address assigned to the virtual network port 104) and the MAC address of the destination network node. In another example, the virtual network port 104 may include the security group association of the physical server 202 in the header of the encapsulation packet(s) in order to comply with the security controls applied in the virtual network 212, typically security controls of the VPC.

Figure 3:
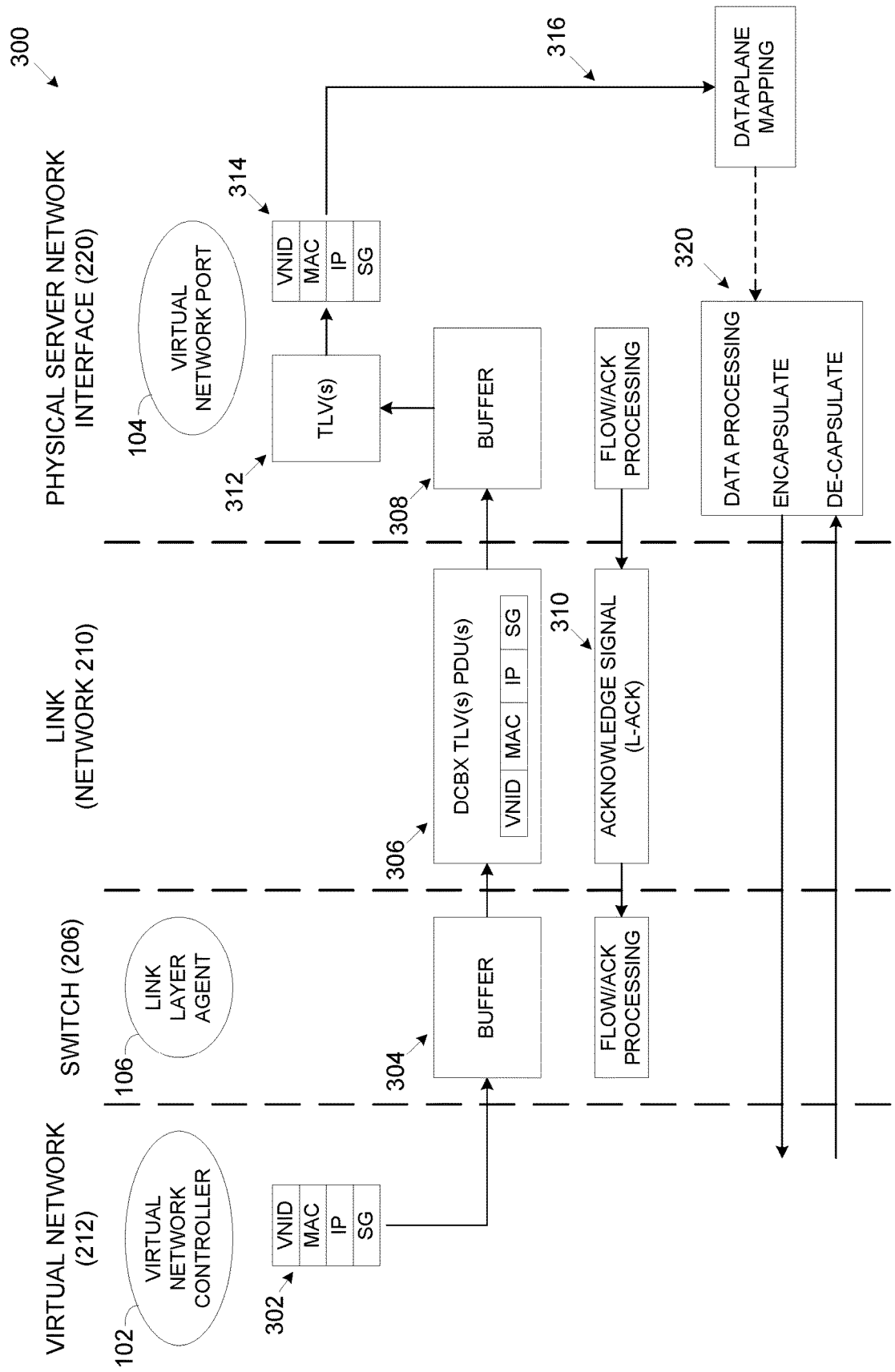
FIG. 3 is an exemplary sequence for providing virtual network settings to a virtual network port mapping a physical server in a virtual network to support packets transfer between the physical server and nodes connected to the virtual network, according to some embodiments of the present invention.

Reference is now made to FIG. 3, which is an exemplary sequence for providing virtual network settings to a virtual network port mapping a physical server in a virtual network to support packets transfer between the physical server and nodes connected to the virtual network, according to some embodiments of the present invention. An exemplary sequence 300 depicts the path of the virtual network settings transmitted from an (edge) switch such as the switch 206 according to the processes 110, 120 and 130 for configuring a virtual network port such as the virtual network port 104 deployed in an enhanced network interface such as the enhanced network interface 220 of a physical server such as the a physical server 202 to map the physical server 202 in a virtual network such as the virtual network 212 providing an abstraction layer over a network such as the network 210 as shown in system 200.

A virtual network controller such as the virtual network controller 102 may compute 302 one or more of the virtual network settings assigned to the virtual network port 104 mapping the physical server 202 as described in step 112 of the process 110. The virtual network settings may include, for example, the VNID of the virtual network 212, a MAC address assigned to the virtual network port 104, an IP address virtual network port 104 and SG settings for associating the physical server 202 with security groups in the virtual network 212.

The virtual network controller 102 using the control plane of the virtual network 210 according to one or more of the network management protocols (e.g. SNMP, NETCONF) may transmit the virtual network settings to the link layer agent 106 deployed on the switch 206 as described in step 114 of the process 110. In particular, the virtual network controller 102 may create one or more extension TLVs defined by an extended link layer configuration protocol, for example, the LLDP, in particular the DCBX extension protocol to the LLDP protocol as described in step 122 of the process 120.

The link layer agent 106 may store the received extension TLV(s) comprising the virtual network settings in one or more memory structures 304, for example, a buffer allocated in the switch 206. Using the data processing and flow control engines of the switch 206, the link layer 106 may transmit to the enhanced network interface 220 one or more configuration PDUs 306 of the LLDP, specifically the DCBX comprising the extension TLV(s) stored in the buffer 304.

The virtual network port 104, using the data processing and flow control engines of the enhanced network interface 220, may receive the configuration PDU(s) and may extract the extension TLV(s) from the configuration PDU(s). The virtual network port 104 may store the extracted extension TLV(s) in one or more memory structures 308, for example, a buffer allocated and managed at the enhanced network interface 220 side. The virtual network port 104, using the flow control engine of the enhanced network interface 220, may further respond to the reception of each configuration PDU with a respective acknowledge signal 310.

On completion of reception of the extension TLV(s) 312 containing the virtual network settings assigned to the virtual network port 104, the virtual network port 104 may extract the virtual network settings 314 from the extension TLV(s) and may apply them to one or more data plane control modules used by the enhanced network interface 220 to resolve source and/or destination addresses for transmitted and/or received packets. For example, the virtual network port 104 may update 316 the virtual network settings in one or more of the data plane mapping records at the enhanced network interface 220, for example, the routing table, the routing map, a memory, a database and/or the like.

After the virtual network port 104 is properly deployed and configured in the enhanced network interface 220 according to the received virtual network settings, the virtual network port 104 may start processing 320 data packets transferred between the physical server 202 and one or more of the network nodes 204 of the virtual network 212 as described in step 136 of the process 130. For example, in the egress path, the virtual network port 104 may encapsulate one or more data packets (e.g. unicast packets, multicast packets and/or broadcast packets) outgoing from the physical server 202. The virtual network port 104 may encapsulate the outgoing packets in one or more encapsulation packets according to the virtual network encapsulation protocol used in the virtual network 212, for example, VXLAN using the virtual network settings assigned to the virtual network port 104. Finally, the virtual network port 104 may transmit the encapsulation packets over the virtual network 212. In the ingress path, the virtual network port 104 may receive one or more incoming packets (e.g. unicast packets, multicast packets and/or broadcast packets) from one or more of the network nodes 204 via the virtual network 212. The virtual network port 104 may use the virtual network settings to process the incoming packets, for example de-capsulate the incoming packets which may be encapsulated according to the virtual network encapsulation protocol used in the virtual network 212, for example, VXLAN. The virtual network port 104 may then forward the data packets extracted from the encapsulation packets to one or more software modules executed by the physical server 202.

Figure 4A:
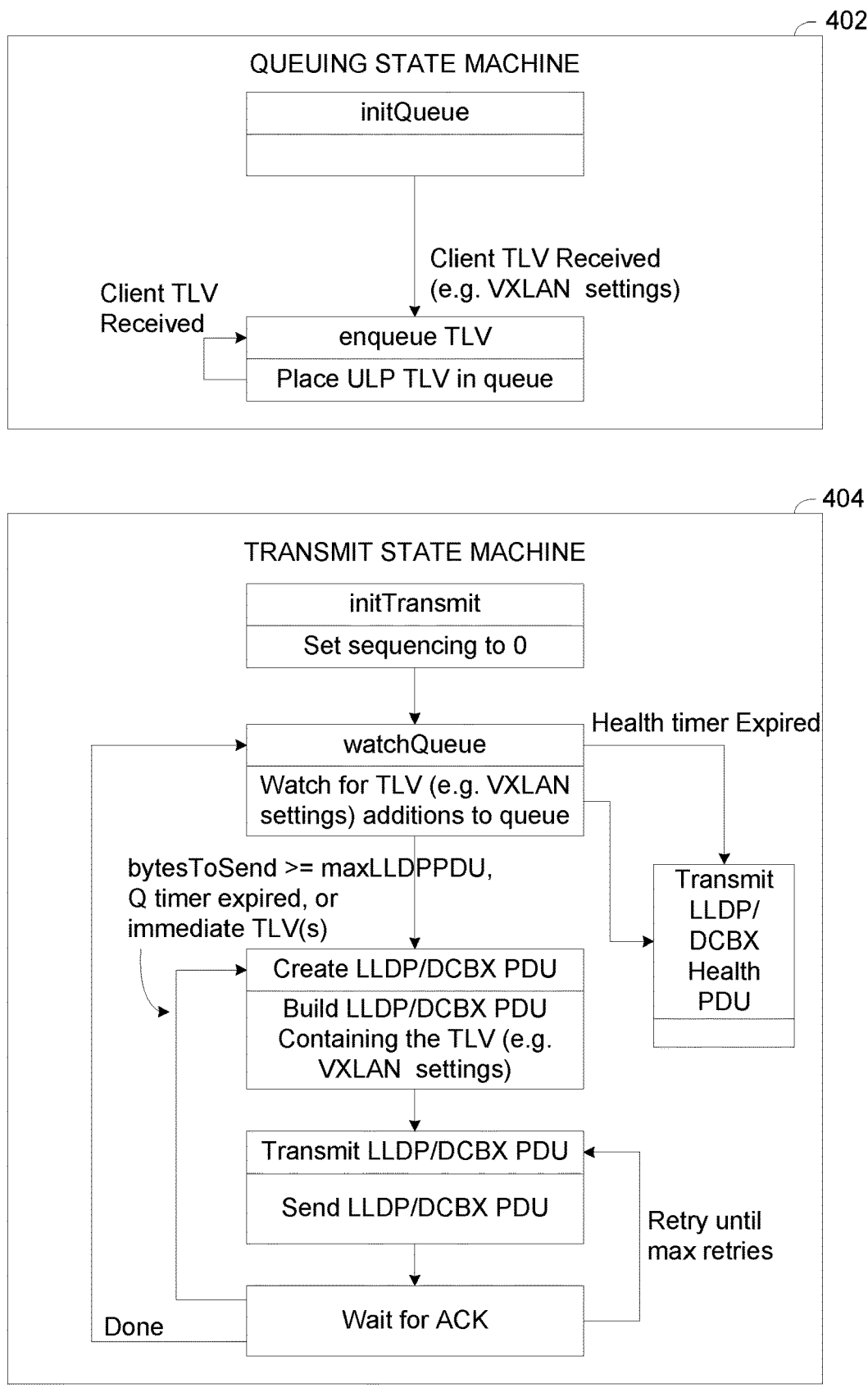
FIG. 4A and FIG. 4B present schematic illustrations of exemplary state machines deployed to queue, transmit and receive virtual network settings provided to a virtual network port mapping a physical server in a virtual network to support packets transfer between the physical server and nodes connected to the virtual network, according to some embodiments of the present invention.
Figure 4B:
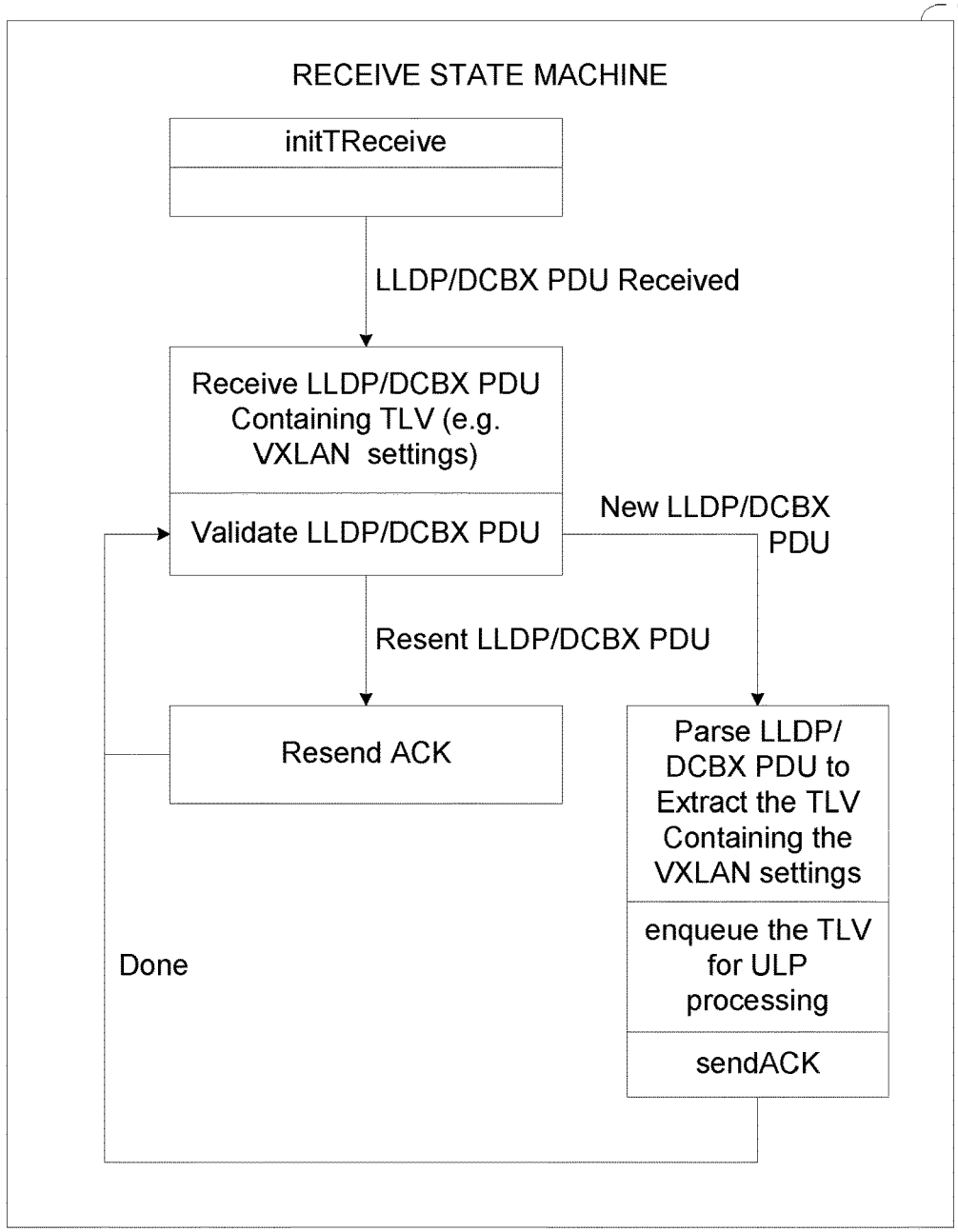

Reference is now made to FIG. 4A and FIG. 4B, which present schematic illustrations of exemplary state machines deployed to queue, transmit and receive virtual network settings provided to a virtual network port mapping a physical server in a virtual network to support packets transfer between the physical server and nodes connected to the virtual network, according to some embodiments of the present invention. It should be noted that some of the embodiments presented in FIG. 4A and FIG. 4B are directed to the VXLAN virtual network encapsulation protocol. However, this should not be construed as limiting since the implementation of the VXLAN encapsulation protocol is exemplary and may similarly apply to any other of the virtual network virtualization and/or tunneling protocols, for example, the encapsulation protocols such as, for example, NVGRE, GENEVE, STT and/or the like.

An exemplary queuing state machine 402 may be applied by a link layer agent such as the link layer agent 106 deployed in a switch such as the switch 206 for arranging in a queue one or more of the TLVs received from a virtual network controller such as the virtual network controller 102 of a virtual network such as the virtual network 212 providing an abstraction layer over a network such as the network 210. The TLV(s) of the LLDP/DCBX protocol, in particular extension TLV(s) added to the LLDP/DCBX protocol to support transfer of virtual network settings may include one or more virtual network settings assigned to a virtual network port such as the virtual network port 104 deployed in an enhanced network interface such as the enhanced network interface 220 of a physical server such as the physical server 202 for mapping the physical server 202 in the virtual network 212. For example, assuming the virtual network 212 employs the VXLAN encapsulation protocol, the extension TLV(s) may include VXLAN settings assigned to the virtual network port 104 for encapsulation and de-capsulation of data packets exchanged between the physical server 202 and one or more network nodes such as the network nodes 204 of the virtual network 212. As seen, the queuing state machine 402 supports reception of multiple extension TLVs and may push each received extension TLV into a queue.

An exemplary transmit state machine 404 may be applied by the link layer agent 106 deployed in the switch 206 to control transmission of the configuration PDU(s) containing the extension TLVs according to the extended LLDP protocol, specifically the extended DCBX protocol. The transmit state machine 404 may process the extension TLV(s) and create one or more configuration PDUs, for example, LLDP/DCBX PDUs to include the extension TLV(s) containing the virtual network settings. Continuing the previous example, assuming the virtual network 212 employs the VXLAN encapsulation protocol, the transmit state machine 404 may transmit the transmit state machine 404 may create and build one or more LLDP/DCBX PDUs comprising the extension TLV(s) containing the VXLAN settings. The transmit state machine 404 may then transmit each of the LLDP/DCBX PDU(s) and wait for an acknowledge signal indicating reception of the respective LLDP/DCBX PDU by the enhanced network interface 220. The transmit state machine 404 may re-transmit (retry) one or more LLDP/DCBX PDUs for which an acknowledge signal is not received. The number of retries may be predefined.

An exemplary receive state machine 406 may be applied by the virtual network port 104 deployed in the enhanced network interface 220 to control reception of the configuration PDU(s), for example, LLDP/DCBX PDU(s) containing the extension TLVs. The receive state machine 406 may receive the LLDP/DCBX PDU(s) from the link layer agent 106 deployed in the switch 206 and may optionally validate the received PDU(s) to ensure their integrity. Continuing the previous example, assuming the virtual network 212 employs the VXLAN encapsulation protocol, the LLDP/DCBX PDU(s) received and validated by the receive state machine 406 may include one or more of the extension TLV(s) containing the VXLAN settings. The receive state machine 406 may then transmit an acknowledge signal for each received LLDP/DCBX PDU. The receive state machine 406 may further re-transmit the acknowledge signal for each re-transmitted LLDP/DCBX PDU. The receive state machine 406 may extract the extension TLV(s) from the LLDP/DCBX PDU(s) and store them in a queue which may be used to forward the extension TLV(s), in particular the virtual network settings contained in the extension TLV(s), for example, the VXLAN settings to one or more Upper Level Protocols (ULP).

Such ULP(s) may be utilized by the virtual network port 104 which may apply and/or use the received virtual network settings to map the physical server 202 in the virtual network 212 and enable packets transfer between the physical server 202 and the network node(s) 204. For example, assuming the virtual network 212 employs the VXLAN encapsulation protocol and the received virtual network settings are the VXLAN settings, the virtual network port 104 may apply and/or use the received VXLAN settings to encapsulate and de-capsulate outgoing and incoming packets from/to the physical server 202. In another example, the virtual network settings may include one or more security group parameters required to enforce one or more security policies in the virtual network 212. The virtual network port 104 may apply and/or use the received security group parameter(s) to conform and follow the security policy(s) applied in the virtual network 212. In another example, the virtual network settings may include one or more multicast grouping parameters to form one or more multicast groups of computing nodes 204 in the virtual network 212. The virtual network port 104 may apply and/or use the received multicast grouping parameter(s) to join one or more of these multicast group(s) and/or to support data exchange with one or more of this multicast group(s). In another example, the virtual network settings may include one or more additional parameters required for correcting functionality of the virtual network 212. The virtual network port 104 executing one or more network correction algorithms may apply and/or use the received additional parameter(s) to support the network functionality correction.

It is expected that during the life of a patent maturing from this application many relevant systems, methods and computer programs will be developed and the scope of the terms virtualization protocols, tunneling protocols, encapsulation protocols and link layer configuration protocols are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of configuring a virtual port for a physical server to support packets transfer between the physical server and other network nodes over a virtual network, comprising:
   using at least one processor for:
      transmitting at least one configuration Protocol Data Unit (PDU) of an extended Link Layer Data Protocol (LLDP) to a Network Interface Card (NIC) of the physical server connected to a network, the at least one configuration PDU comprising at least one extension Type Length Value (TLV) defining at least one virtual network setting for a virtual network port mapping the physical server in the virtual network;
      wherein the NIC comprising independent processing and memory resources, the NIC is configured to execute the virtual network port using the independent processing and memory resources completely separated from an execution environment of the physical server to support exchange of packets between the physical server and at least one of a plurality of nodes of the virtual network by processing outgoing and incoming packets according to at least one virtual network virtualization protocol using the at least one virtual network setting.

2. The method of claim 1, wherein the virtual network is at least part of a Virtual Private Cloud (VPC).

3. The method of claim 1, wherein the physical server is a bare-metal server deployed as part of a VPC.

4. The method of claim 1, wherein the at least one virtual network virtualization protocol comprising at least one virtual network encapsulation protocol, the virtual network port supports exchange of the packets by encapsulating and de-capsulating outgoing and incoming packets according to the at least one virtual network encapsulation protocol using the at least one virtual network setting.

5. The method of claim 4, wherein the at least one virtual network encapsulation protocol is a member of a group consisting of: Virtual Extensible Local Area Network (VXLAN), Network Virtualization using Generic Routing Encapsulation (NVGRE), Generic Network Virtualization Encapsulation (GENEVE) and Stateless Transport Tunneling (STT).

6. The method of claim 1, wherein the at least one configuration PDU is defined by an extended Data Center Bridging Exchange (DCBX) extension of the LLDP, the extended DCBX is extended to support the at least one extension TLV.

7. The method of claim 1, wherein the at least one virtual network setting is a member of a group consisting of: a virtual network address assigned to the virtual network port deployed in the NIC to map the physical server in a range of virtual addresses of the virtual network, a virtual network identifier (VNID) of the virtual network, a VPC identifier (VPC ID), a security group association for the physical server and a multicast group association for the physical server.

8. The method of claim 7, wherein the virtual network address defines an Internet Protocol (IP) address assigned to the virtual network port deployed in the NIC in the range of IP addresses of the virtual network.

9. The method of claim 8, further comprising the virtual network address defines a Media Access Control (MAC) address assigned to the virtual network port, the virtual network port applies the IP address and the MAC address for encapsulation and de-capsulation.

10. The method of claim 1, wherein each of the packets exchanged between the NIC of the physical server and the at least one node of the virtual network is a member of a group consisting of: a unicast packet, a multicast packet and a broadcast packet.

11. A system for configuring a virtual port for a physical server to support packets transfer between the physical server and other network nodes over a virtual network, comprising:
    at least one processor executing a code, the code comprising:
       code instructions to transmit at least one configuration Protocol Data Unit (PDU) of an extended Link Layer Data Protocol (LLDP) to a Network Interface Card (NIC) of the physical server connected to a network, the at least one configuration PDU comprising at least one extension Type Length Value (TLV) defining at least one virtual network setting for a virtual network port mapping the physical server in the virtual network; wherein the NIC comprising independent processing and memory resources, the NIC is configured to execute the virtual port using the independent processing and memory resources completely separated from an execution environment of the physical server to support exchange of packets between the physical server and at least one of a plurality of nodes of the virtual network by processing outgoing and incoming packets according to at least one virtual network virtualization protocol using the at least one virtual network setting.

12. The system of claim 11, wherein the virtual network is at least part of a Virtual Private Cloud (VPC).

13. The system of claim 11, wherein the physical server is a bare-metal server deployed as part of a VPC.

14. The system of claim 11, wherein each of the packets exchanged between the NIC of the physical server and the at least one node of the virtual network is a member of a group consisting of: a unicast packet, a multicast packet and a broadcast packet.

15. A computer program product for configuring a virtual port for a physical server to support packets transfer between the physical server and other network nodes over a virtual network, comprising:
a non-transitory computer readable storage medium; and
first program instructions for transmitting at least one configuration Protocol Data Unit (PDU) of an extended Link Layer Data Protocol (LLDP) to a Network Interface Card (NIC) of the physical server connected to a network, the at least one configuration PDU comprising at least one extension Type Length Value (TLV) defining at least one virtual network setting for a virtual network port mapping the physical server in the virtual network, the NIC comprising independent processing and memory resources, the NIC is configured to execute the virtual network port using the independent processing and memory resources completely separated from an execution environment of the physical server to support exchange of packets between the physical server and at least one of a plurality of nodes of the virtual network by processing outgoing and incoming packets according to at least one virtual network virtualization protocol using the at least one virtual network setting;
wherein the first program instructions are executed by at least one processor from the non-transitory computer readable storage medium.

16. The computer program product of claim 15, wherein the at least one virtual network virtualization protocol comprising at least one virtual network encapsulation protocol, the virtual network port supports exchange of the packets encapsulating and de-capsulating outgoing and incoming packets according to the at least one virtual network encapsulation protocol using the at least one virtual network setting.

17. The computer program product of claim 16, wherein the at least one virtual network encapsulation protocol is a member of a group consisting of: Virtual Extensible Local Area Network (VXLAN), Network Virtualization using Generic Routing Encapsulation (NVGRE), Generic Network Virtualization Encapsulation (GENEVE) and Stateless Transport Tunneling (STT).

18. The computer program product of claim 15, wherein the at least one configuration PDU is defined by an extended Data Center Bridging Exchange (DCBX) extension of the LLDP, the extended DCBX is extended to support the at least one extension TLV.

19. The computer program product of claim 15, wherein the at least one virtual network setting is a member of a group consisting of: a virtual network address assigned to the virtual network port of deployed in the NIC to map the physical server in a range of virtual addresses of the virtual network, a virtual network identifier (VNID) of the virtual network, a VPC identifier (VPC ID), a security group association for the physical server and a multicast group association for the physical server.

20. The computer program product of claim 15, wherein each of the packets exchanged between the NIC of the physical server and the at least one node of the virtual network is a member of a group consisting of: a unicast packet, a multicast packet and a broadcast packet.

* * * * *